(12) United States Patent
Knight

(10) Patent No.: US 11,258,217 B2
(45) Date of Patent: *Feb. 22, 2022

(54) POWER TOOL AND SYSTEM

(71) Applicant: Transform SR Brands LLC, Hoffman Estates, IL (US)

(72) Inventor: Colin G. Knight, Winnetka, IL (US)

(73) Assignee: TRANSFORM SR BRANDS LLC, Hoffman Estates, IL (US)

(*) Notice: Subject to any disclaimer, the term of this patent is extended or adjusted under 35 U.S.C. 154(b) by 108 days.

This patent is subject to a terminal disclaimer.

(21) Appl. No.: 16/830,957

(22) Filed: Mar. 26, 2020

(65) Prior Publication Data

US 2020/0295517 A1 Sep. 17, 2020

Related U.S. Application Data

(63) Continuation of application No. 16/029,902, filed on Jul. 9, 2018, now Pat. No. 10,608,391, which is a continuation of application No. 14/146,450, filed on Jan. 2, 2014, now Pat. No. 10,027,078.

(51) Int. Cl.
| | |
|---|---|
| *H02J 7/00* | (2006.01) |
| *H01R 27/00* | (2006.01) |
| *B25F 5/02* | (2006.01) |
| *H02K 7/14* | (2006.01) |
| *H01M 50/267* | (2021.01) |
| *H01R 29/00* | (2006.01) |

(52) U.S. Cl.
CPC ............... *H01R 27/00* (2013.01); *B25F 5/02* (2013.01); *H01M 50/267* (2021.01); *H02K 7/145* (2013.01); *H01M 2220/30* (2013.01); *H01R 29/00* (2013.01)

(58) Field of Classification Search
USPC .................................................. 320/112–114
See application file for complete search history.

(56) References Cited

U.S. PATENT DOCUMENTS

| | | | |
|---|---|---|---|
| 4,352,052 | A | 9/1982 | Opper |
| 4,963,812 | A | 10/1990 | Mischenko et al. |
| 5,076,805 | A | 12/1991 | Welch |
| 5,316,873 | A | 5/1994 | Scrivano |
| 5,656,914 | A | 8/1997 | Nagele et al. |
| 6,057,608 | A | 5/2000 | Bailey, Jr. et al. |
| 6,525,511 | B2 | 2/2003 | Kubale et al. |

(Continued)

FOREIGN PATENT DOCUMENTS

| | | |
|---|---|---|
| DE | 202013103025 | 9/2013 |
| EP | 833137 | 9/2007 |

(Continued)

OTHER PUBLICATIONS

"Check Out Dewalt 18V 1.3AH Replacement Power Tool Battery for DW9095, DW9096", 1 page, dated Aug. 6, 2012.

(Continued)

*Primary Examiner* — Samuel Berhanu
(74) *Attorney, Agent, or Firm* — McAndrews, Held & Malloy, Ltd.

(57) ABSTRACT

Batteries having different form factors and power tools that are capable of using such batteries are described. In some embodiments, a power tool may use batteries having a post form factor as well as batteries having a slide form factor.

20 Claims, 6 Drawing Sheets

(56) References Cited

U.S. PATENT DOCUMENTS

| | | |
|---|---|---|
| 6,617,824 B1 | 9/2003 | Zedell et al. |
| 6,621,246 B2 | 9/2003 | Kubale et al. |
| 6,840,335 B1 | 1/2005 | Wu |
| 6,876,173 B2 | 4/2005 | Mastaler et al. |
| 6,902,293 B2 | 6/2005 | Tang |
| 6,965,214 B2 | 11/2005 | Kubale et al. |
| 7,018,233 B1 | 3/2006 | Griffin, III et al. |
| 7,183,745 B2 | 2/2007 | Kubale et al. |
| 7,339,350 B2 | 3/2008 | Kubale et al. |
| 7,435,508 B2 | 10/2008 | Lee et al. |
| 7,443,137 B2 | 10/2008 | Scott et al. |
| 7,468,596 B2 | 12/2008 | Shum |
| 7,514,172 B2 | 4/2009 | Furth et al. |
| 7,629,766 B2 | 12/2009 | Sadow |
| 7,695,853 B2 | 4/2010 | Wells et al. |
| 7,884,573 B1 | 2/2011 | Larsen |
| 7,897,276 B2 | 3/2011 | Campesi |
| 7,950,955 B2 | 5/2011 | Larsen |
| 8,025,994 B2 | 9/2011 | Nishimaki et al. |
| 8,115,452 B2 | 2/2012 | Liang |
| 8,120,318 B2 | 2/2012 | Nakasho et al. |
| 8,646,624 B2 | 2/2014 | Fernandez et al. |
| 2003/0039880 A1 | 2/2003 | Turner et al. |
| 2004/0257038 A1 | 12/2004 | Johnson et al. |
| 2005/0077873 A1 | 4/2005 | Watson et al. |
| 2006/0088377 A1 | 4/2006 | Rejman et al. |
| 2006/0268504 A1* | 11/2006 | Shimizu .............. B25F 5/02 439/155 |
| 2007/0090796 A1 | 4/2007 | Norris |
| 2007/0273211 A1 | 11/2007 | Wang et al. |
| 2008/0012526 A1 | 1/2008 | Sadow |
| 2009/0180829 A1* | 7/2009 | Rejman .............. B25F 5/02 403/331 |
| 2011/0012560 A1 | 1/2011 | Sakakibara |
| 2013/0002175 A1 | 1/2013 | Shimizu et al. |
| 2013/0031762 A1 | 2/2013 | Chellew et al. |
| 2014/0321034 A1 | 10/2014 | Takeuchi |
| 2015/0214520 A1 | 7/2015 | Nishikawa et al. |
| 2015/0357612 A1 | 12/2015 | Uchida et al. |

FOREIGN PATENT DOCUMENTS

| | | |
|---|---|---|
| GB | 2386746 | 9/2003 |
| WO | 2005038954 | 4/2005 |

OTHER PUBLICATIONS

"Great Price Battery Adapter MML18 for $34.99", 1 page, dated Aug. 6, 2012.

Extended European Search Report for 14198219.9, dated Jul. 31, 2015. (6 pages).

* cited by examiner

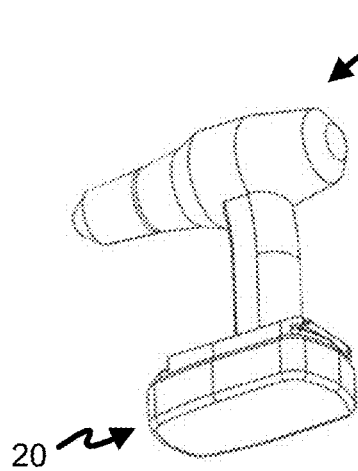
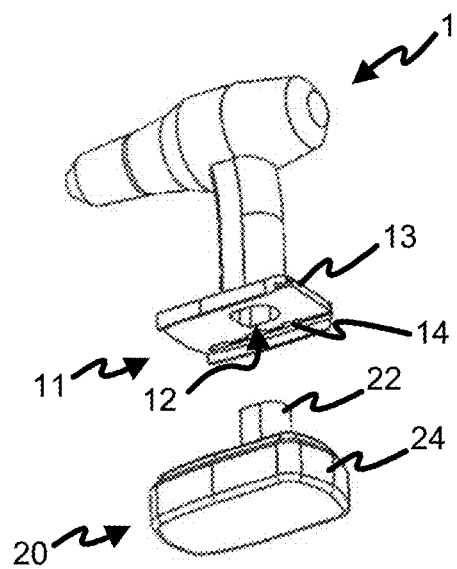
FIG. 1A    FIG. 1B
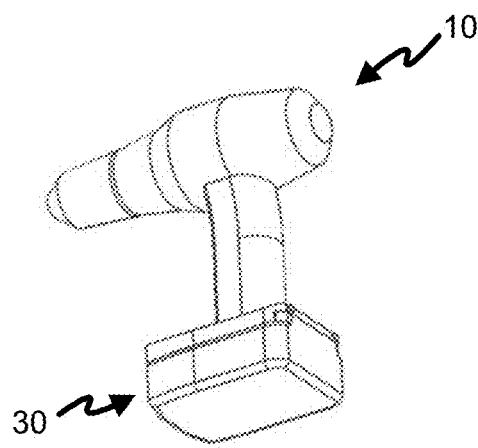
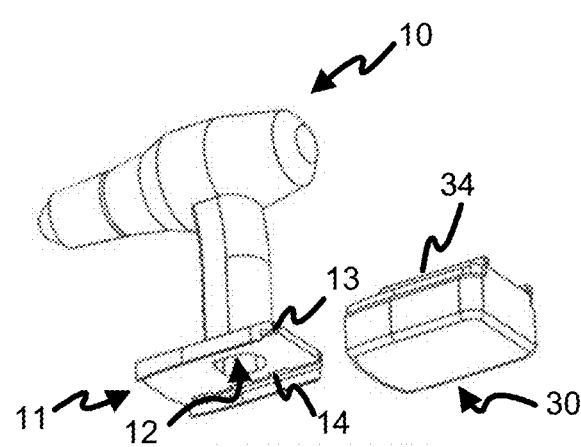
FIG. 2A    FIG. 2B
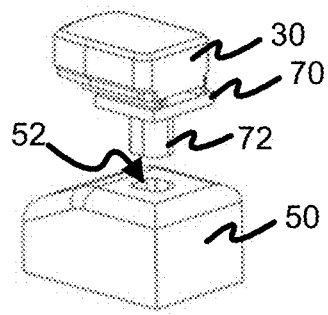
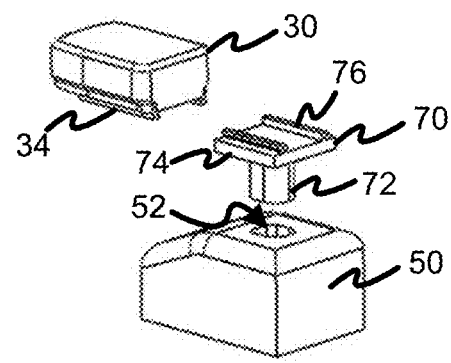
FIG. 3A    FIG. 3B

POWER TOOL AND SYSTEM

FIELD OF THE INVENTION

Various embodiments relate to batteries, and more particularly, to power tool batteries and the power tools that use them.

BACKGROUND OF THE INVENTION

Many homeowners, technicians, contractors, businesses, etc. own a vast array of battery-powered tools. Many of these power tools utilize rechargeable batteries that have been specifically designed for such power tools. Moreover, a line of power tools commonly uses the same specifically designed batteries. Thus, power tool owners may share batteries between power tools of the same line (e.g., an impact drill, impact wrench, circular saw, etc.). However, despite sharing batteries between power tools, power tool owners are still likely to acquire a large number of rechargeable batteries. As such, power tool owners may consider their inventory of batteries as a significant investment in the line of tools. Such investment may aid a power tool vendor in retaining current customers. Unfortunately, such investment may also impede an power tool vendor from adopting and introducing improved battery technology that happens to use a different form factor than the batteries currently in use. In particular, power tool vendors may fear that introducing batteries with a new form factor may alienate their existing customers who have a significant collection of batteries of the current form factor.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Apparatus and methods of promoting the sale of products in an e-commerce environment are substantially shown in and/or described in connection with at least one of the figures, and are set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 1A and 1B show a power tool with battery having a first form factor in accordance with an embodiment of the present invention.

FIGS. 2A and 2B show the power tool of FIGS. 1A and 1B with battery having a second form factor in accordance with an embodiment of the present invention.

FIGS. 3A and 3B show the battery of FIGS. 2A and 2B with an adapter that permits a battery of the second form factor to be used with a battery charger designed for charging batteries of the first form factor in accordance with an embodiment of the present invention.

DETAILED DESCRIPTION OF THE INVENTION

Figure 4B:
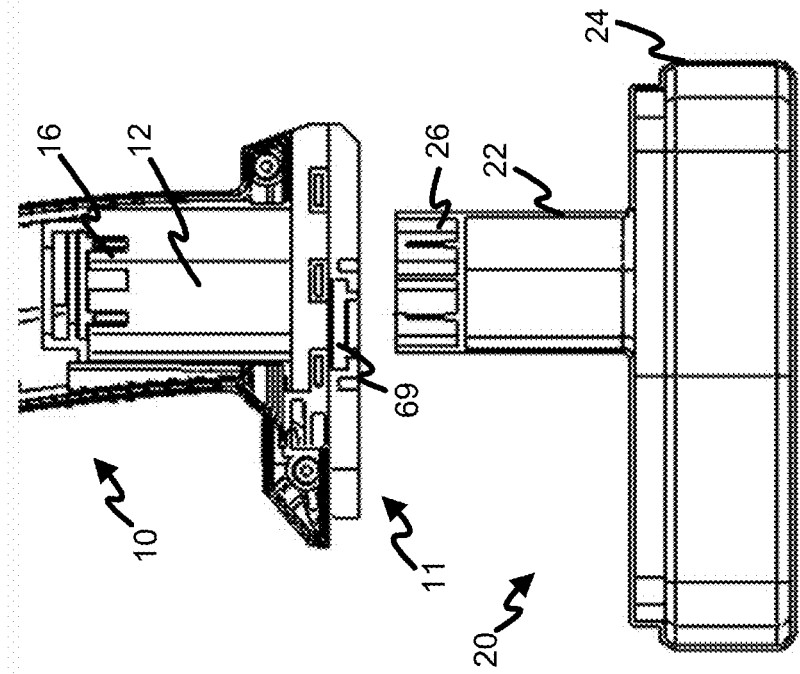
FIGS. 4A-4C show cutaway side views of a power tool and batteries in accordance with an embodiment of the present invention.

Aspects of the present invention are related to power tools and batteries used by such tools. More specifically, certain embodiments of the present invention relate to power tools that may use batteries having a new form factor (e.g., slide batteries) and batteries having an existing form factor (e.g., post batteries). Thus, a power tool vendor may introduce a new battery form factor into the market without alienating their existing customers who may continue to use their stock of existing batteries with the new power tools.

FIGS. 1A and 1B show a power tool 10 such as an impact drill, impact wrench, circular saw, etc. with a battery 20 having a first form factor. In particular, FIG. 1B depicts a post battery 20 detached from the power tool 10 and FIG. 1A depicts the post battery 20 attached to the power tool 10. As shown in FIGS. 1A and 1B, the power tool 10 may having a battery compartment 11. The battery compartment 11 may include a cavity 12 configured to receive a post portion 22 of the post battery 20. In particular, the post portion 22 may be inserted into a proximal end of the cavity 12. The post portion 22 may slide longitudinally into the cavity 12 and toward a distal end of the cavity 12 until properly seated and attached to power tool 10. When properly seated, a base portion 24 and possibly part of the post portion 22 may remain visible beyond a base portion 13 of the battery compartment 11.

FIGS. 2A and 2B depict the same power tool 10 with a battery 30 having a second form factor. In particular, FIG. 2B depicts a slide battery 30 detached from the power tool 10 and FIG. 2A depicts the slide battery 30 attached to the power tool 10. Unlike the battery 20, the slide battery 30 does not have a post portion 22 to be inserted into the cavity 12 of the power tool 10. Instead, the power tool 10 and the battery 30 include tabs 14, 34 that engage one another and permit the slide battery 30 to be attached to the battery compartment 11 by sliding the battery 30 transversely across the base portion 13 and the cavity 12.

FIGS. 3A and 3B depict a battery charger 50 with a cavity 52 configured to receive the post portion 22 of the post battery 20. See, FIG. 1B. The battery charger 50 is configured to charge the post battery 20 when the post portion 22 is inserted in cavity 52 and the post battery 20 is properly seated in the battery charger 50. FIGS. 3A and 3B further depict an adapter 70 having a post portion 72. The post portion 72 is dimensioned and configured in a manner similar to the post portion 22 of the post battery 20. In particular, the post portion 72 includes first electrical contacts (not shown) that are configured to electrically couple to electrical contacts (not shown) in the cavity 52 of the battery charger 50 when the post portion 72 is properly inserted and seated in the cavity 52.

The adapter 70 may further include a base portion 74 having channels/tabs 76 that are configured to slidably engage the channels/tabs 34 of the slide battery 30. The adapter 70 may include second electrical contacts (not shown) positioned toward the base portion 74 that are configured to electrically couple with contacts of the slide battery 30 when the slide battery 30 is properly engaged with the adapter 70. Moreover, the adapter 70 may provides electrical pathways between the first and second contacts in order to permit the battery charger 50 to charge the battery 30 when the battery 30 is properly engaged to the adapter 70 and the adapter 70 is properly seated in the cavity 52 of the charger 50.

Figure 4A:
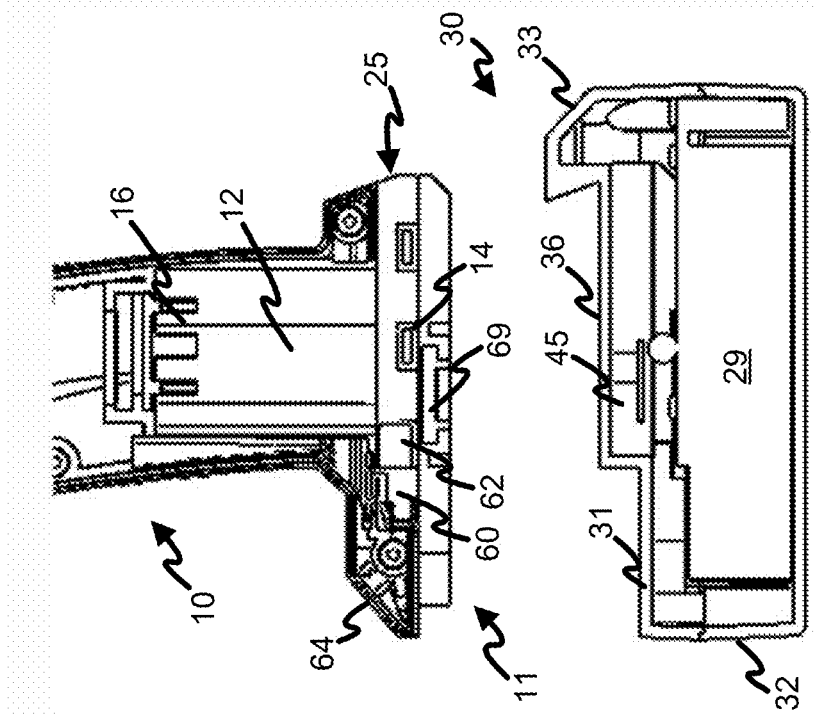

FIG. 4A provides a cutaway, side view of the power tool 10 with the slide battery 30 in a disengaged position. As shown, the power tool 10 includes a battery compartment 11 having the cavity 12 despite not needing the cavity 12 to accommodate the slide battery 30. Moreover, a power block 60 and one of its male, electrical spade connectors 62 are shown in the battery compartment 11 of the power tool 10. As explained in further detail below, the connectors 62 are positioned to engage corresponding connectors of slide battery 30 when the slide battery 30 is in an engaged position.

FIG. 4B provides a cutaway, side view of the power tool 10 with the post battery 20 in a disengaged position. FIG. 4B clarifies the relationship between electrical contacts 26 of the post battery 20 and the electrical contacts 16 of the power tool 10 that are positioned toward a distal end of the cavity 12. In particular, the post battery electrical contacts 26 engage the power tool electrical contacts 16 when the post portion 22 is inserted into the cavity 12. Such engagement of contacts provides an electrical pathway between battery cells in the base portion 24 of the post battery 20 and thus permits the battery cells to power various electrical components of the power tool 10 such as motors, lights, circuitry, controllers, etc.

Figure 4C:
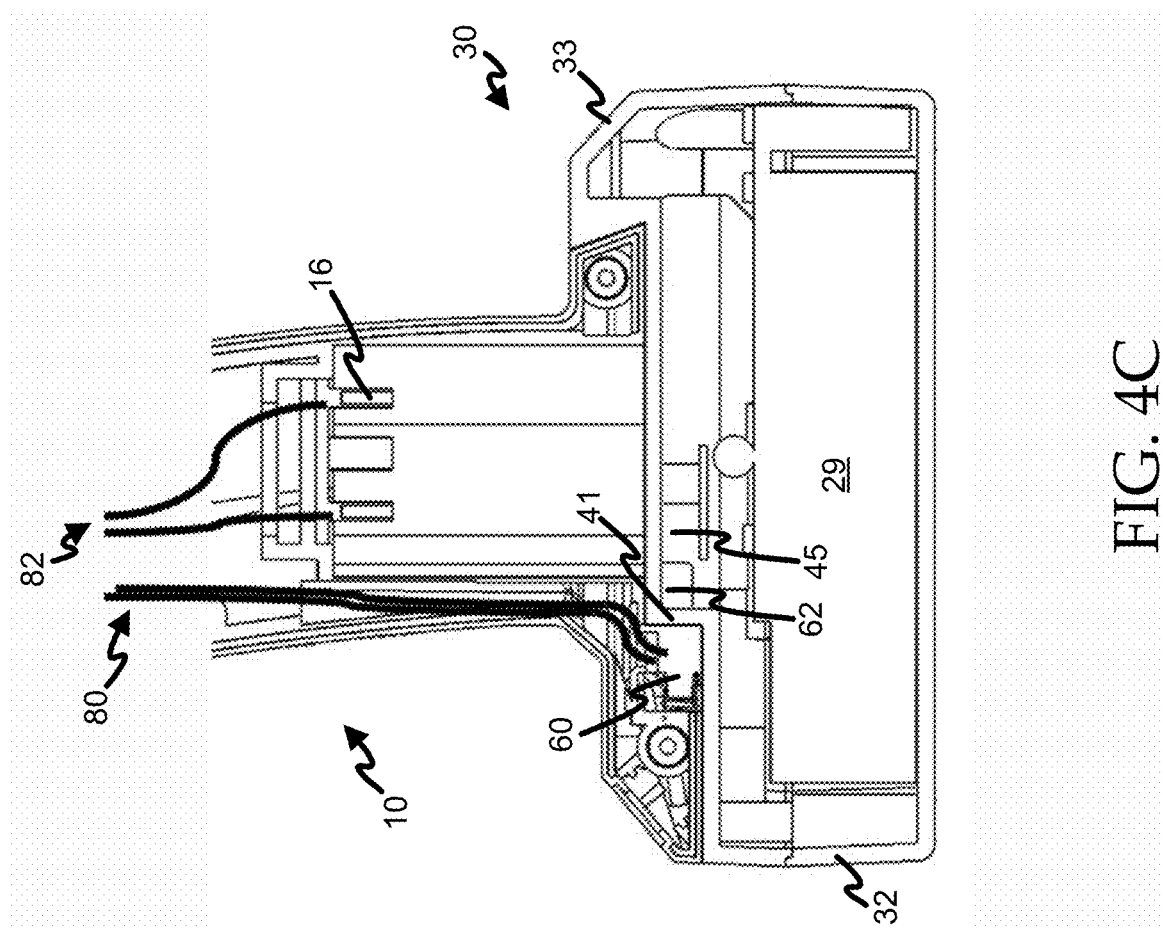

FIG. 4C provides a cutaway, side view of the power tool 10 with the slide battery 30 in an engaged position. In particular, a male, electrical spade connector 62 of the power block 60 is shown extended through a front portion 41 of the engaged slide battery 30 and engaged with a female, electrical spade connector 45 of the slide battery 30. Moreover, a first set of wires 80 are coupled to the power block 60 and the connectors 62 to provide an electrical pathway between electrical components of the power tool 10 and battery cells 29 of the engaged slide battery 30. Similarly, a second set of wires 82 are coupled to connectors 16 to provide an electrical pathway between electrical components of the power tool 10 and battery cells of an engaged post battery 20.

Figure 5A:
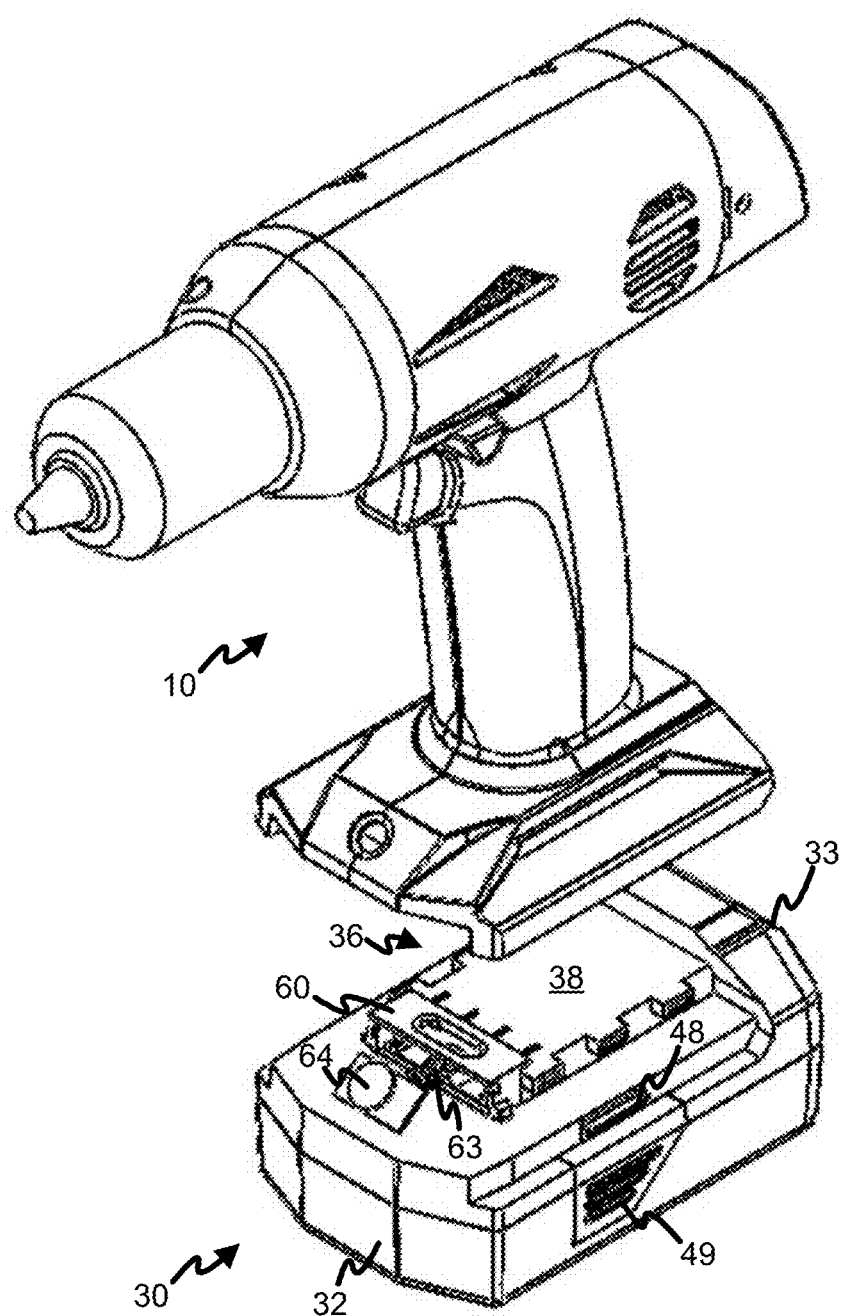
FIGS. 5A-5C show perspective views of a power tool and a slide battery in accordance with an embodiment of the present invention.
Figure 5B:
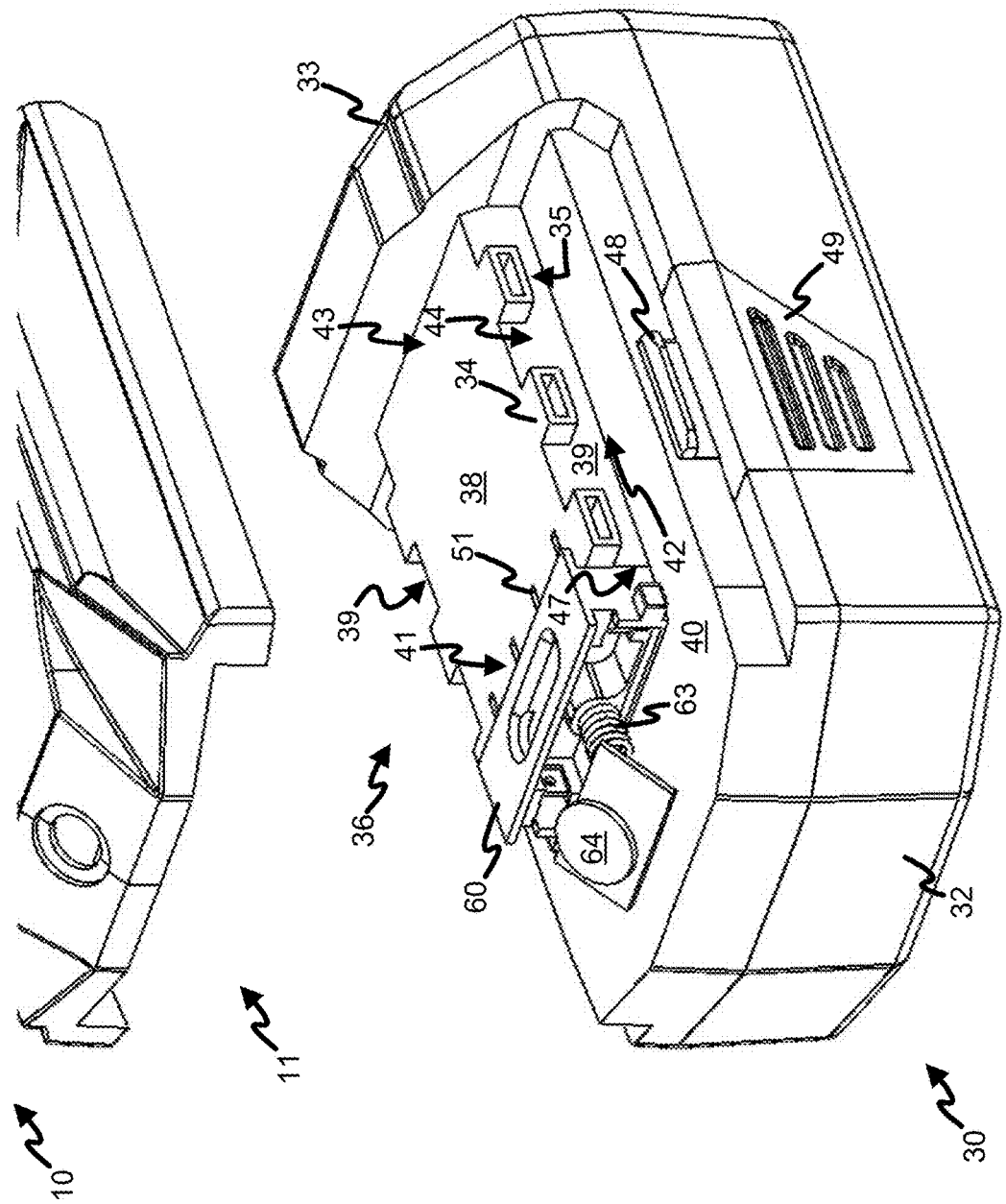
Figure 5C:
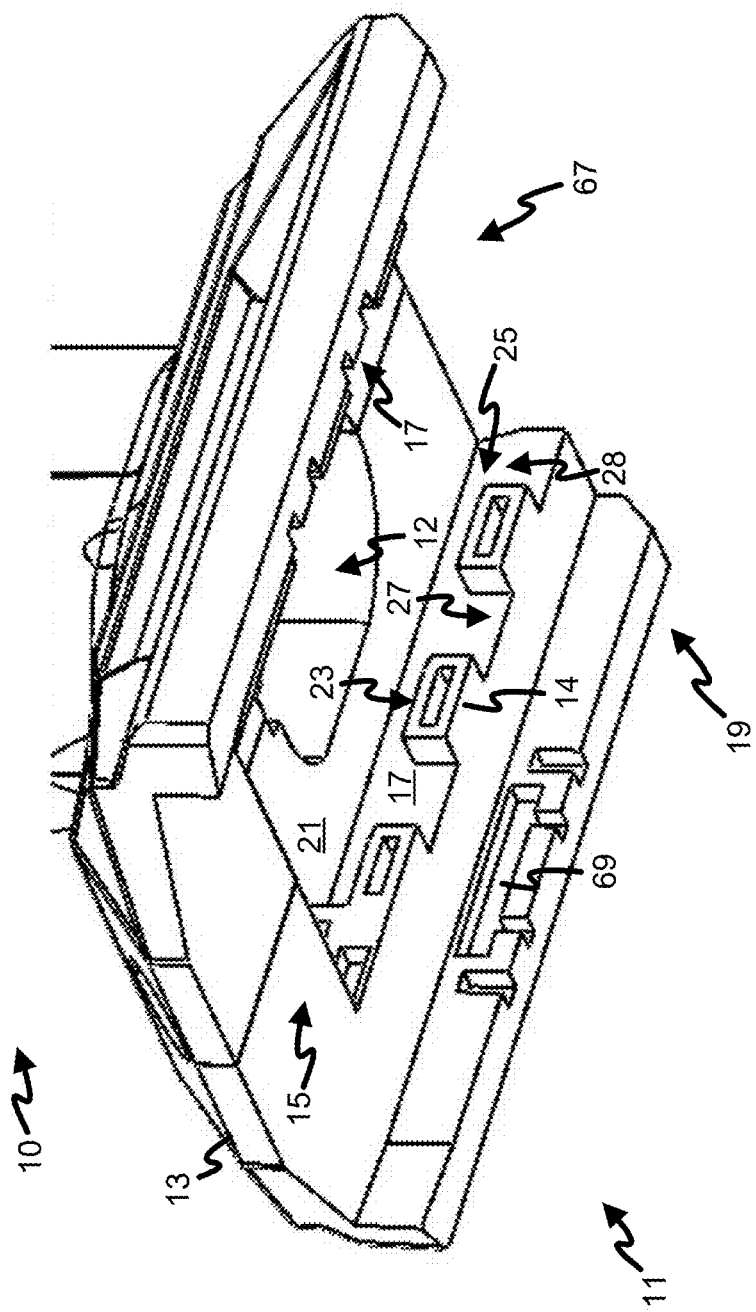

Referring now to the cutaway and perspective views of FIGS. 4A-4C and FIGS. 5A-5C, aspects of the mechanical and electrical interface between the power tool 10 and the slide battery 30 are described in greater detail. The slide battery 30 includes one or more battery cells 29 in a housing 31. The housing 31 may include a base portion 32, a rear portion 33, and a mechanical/electrical connector portion 36. The base portion 32 generally houses the one or more battery cells 29. The connector portion 36 generally provides a mechanical/electrical interface between the battery 30 and the power tool 10. The rear portion 33 may provide a mechanical stop that prevents the slide battery 30 from being slid too far along the battery compartment 11. As such, the rear portion 33 may prevent possible damage to the power tool 10 and/or slide battery 30. As shown, the rear portion 33 may also extend above the connector portion 36. As shown in FIG. 5C, the base portion 13 of the battery compartment 11 may include an opening 67 to receive the slide battery 30. Such a configuration of the rear portion 33 may permit the rear portion 33 to cover the opening 67 when the slide battery 30 is in an engaged positioned.

The connector portion 36 includes a shallow, central projection 38 that extends upward from an upper surface 40 of the base portion 32. The central projection 38 further includes tabs 34 that outwardly extend from opposite sides 39 of the projection 38. In particular, each side 39 includes several tabs 34 relatively evenly spaced from the front portion 41 of the central projection 38 to the back portion 43 of the central projection 38. Moreover, each tab 34 generally extends outwardly from the sides 39 and parallel to the upper surface 40. Accordingly, lower surfaces 35 of the tabs 34 and the upper surface 40 of the base portion 32 define a channel 42. Openings 44 between the tabs 34 may receive corresponding tabs 14 of the power tool 10. Such received tabs 14 may slidably traverse the channels 42 as the slide battery 30 is slid into an engaged position.

In another embodiment, each side 39 may include a single tab 34 that runs the length or nearly the length of the central projection 38 from the front portion 41 to the back portion 43 of the central projection 38. In such an embodiment, openings 44 between spaced apart tabs 34 are not present. However, each channel 42 still has an opening 47 toward the front portion 41 of the central projection 38. As such, each channel 42 may receive tabs 14 of the power tool 10 via its respective opening 47 and permit the tabs 14 to slidably traverse the channel 42.

The slide battery 30 may further include detents 48 and release buttons 49. In particular, a left and right side of the slide battery 30 may each include a detent 48 and corresponding release button 49. See, e.g., FIG. 5B. The detents 48 are configured to engage corresponding recesses or catches 69 of the power tool 10 and secure the battery 30 to the power tool 10. See, e.g., FIGS. 4A and 5C. When pressed, the release buttons 49 may actuate correspond detents 48 and cause such detents 48 to disengage the recesses 69, thus permitting the slide battery 30 to be slid into a disengaged position and removed from the power tool 10. It should be appreciated that the post battery 20 may likewise include detents and release buttons to secure the post battery 20 to the power tool 10.

FIGS. 5A and 5B show the power block 60, the spring 63, and the battery indicator 64 (e.g., an LED) detached from the power tool 10 for illustrative purposes. In normal operation, the power block 60, the spring 63, and the battery indicator 64 are not intended to be removed or otherwise detached from the power tool 10. As explained above, the power block 60 includes male, electrical spade connectors 62 that engage female, electrical spade connectors 45 of the slide battery 30. As shown, the front portion 41 may include openings 51 that receive the male, electrical spade connectors 62 of the power block 60 and the female, electrical spade connectors 45 may be aligned with openings 51 to receive the male, electrical spade connectors 62. While FIGS. 5A and 5B depict the power block 60 with male spade connectors 62 that engage female, electrical spade connectors 45 of the slide battery 30, the slide battery 30 in other embodiments may include male connectors that engage female connectors of the power tool 10. In other embodiments, the power tool 10 and slide battery 30 may include electrical connectors that are not spade connectors, female connectors, and/or male connectors.

The spring 63 is positioned such that it exerts a force on the power block 60 that is normal to the front portion 41 of the connector 36. Such force may act as a shock absorber as the slide battery 30 is slid into the engaged position. As such, the spring 63 may help to prevent damage to the electrical connectors 62 as the front portion 41 of the connector 36 engages the power block 60. Besides providing a protective function, the spring 63 may cause the slide battery 30 to slide toward a disengaged position when a user actuates the release buttons 49. Such exerted movement may provide tactile feedback to the user that the battery being removed is a slide battery 30 that is removed via a sliding motion that traverses the battery compartment 11 and not a post battery 20 that is removed via a motion directed longitudinally away from the battery compartment 11.

Referring now to FIG. 5C, details regarding the base portion 13 of the battery compartment 11 are shown. As shown, the base portion 13 includes tabs 14 that are similar to the tabs 34 of the slide battery 30. In particular, tabs 14 extend inwardly from opposite sides 17 of the battery compartment 11. In particular, each side 17 includes several tabs 14 relatively evenly spaced from the front portion 15 of the battery compartment to a back portion 19 of the battery compartment 11. Moreover, each tab 14 generally extends inwardly from the sides 17 and parallel to inner surface 21 of the battery compartment 11. Accordingly, upper surfaces 23 of the tabs 14 and the inner surface 21 define a channel 25. Openings 27 between the tabs 14 may receive corresponding tabs 34 of the slide battery 30. Such received tabs 34 may slidably traverse the channels 25 in each side 17 as the slide battery 30 is slid into an engaged position.

In another embodiment, each side 17 may include a single tab 14 that runs the length or nearly the length of the battery compartment 11 from the front portion 15 to the back portion 19 of the battery compartment 11. In such an embodiment, openings 27 between spaced apart tabs 14 are not present. However, each channel 25 still has an opening 28 toward the back portion 19 of the battery compartment 11. As such, each channel 25 may receive tabs 34 of the slide battery 30 via its respective opening 28 and permit the tabs 34 to slidably traverse the battery compartment 11.

As explained above, each side of the power tool 10 and slide battery 30 may include a single tab 14, 34 that substantially runs the length of each side. Such an embodiment may permit engaging the slide battery 30 to the power tool 10 by sliding the slide battery 30 along the length of the battery compartment 11. However, embodiments in which each side of the power tool 10 and the slide battery 30 have multiple tabs 14, 34 may permit use of the slide battery 30 even when the battery compartment 11 is in a confined space. In particular, the tabs 14, 34 along with their respective openings 27, 44 may permit the slide battery 30 to engage the power tool 10 with a sliding motion that does not slide the length of the battery compartment 11 but only the length of the tabs 14, 34 or shorter. As such, the battery compartment 11 may be placed in a confined space that would not permit the slide battery 30 to slide the length of the battery compartment 11.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A power tool, comprising:
an electrical component; and
a battery compartment comprising electrical connectors and first battery compartment tabs;
wherein the first battery compartment tabs define a first channel between upper surfaces of the first battery compartment tabs and a base surface of the battery compartment;
wherein the first battery compartment tabs are laterally spaced apart to form first openings between side surfaces of adjacent first battery compartment tabs;
wherein the first openings are sized to permit first slide battery tabs of a slide battery to pass through the first openings and into the first channel; and
wherein the first channel permits the first slide battery tabs to slide along the first channel and traverse multiple first battery compartment tabs as the slide battery is slid into engagement with the electrical connectors and electrically coupled the electrical component.

2. The power tool of claim 1, wherein the first battery compartment tabs extend inwardly from a first side surface of the battery compartment.

3. The power tool of claim 2, wherein the first channel runs along the first side surface of the battery compartment.

4. The power tool of claim 1, wherein:
the battery compartment further includes second battery compartment tabs;
the second battery compartment tabs define a second channel between upper surfaces of the second battery compartment tabs and the base surface of the battery compartment;
the second battery compartment tabs are laterally spaced apart to form second openings between side surfaces of adjacent second battery compartment tabs;
the second openings are sized to permit second slide battery tabs of the slide battery to pass through the second openings and into the second channel; and
the second channel permits the second slide battery tabs to slide along the second channel and traverse multiple second battery compartment tabs as the slide battery is slid into engagement with the electrical connectors.

5. The power tool of claim 4, wherein:
the first battery compartment tabs extend inwardly from a first side surface of the battery compartment; and
the second battery compartment tabs extend inwardly from a second side surface of the battery compartment that is opposite the first side surface of the battery compartment.

6. The power tool of claim 5, wherein:
the first channel runs along the first side surface of the battery compartment; and
the second channel runs along the second side surface of the battery compartment.

7. The power tool of claim 1, further comprising at least one recess that receives a detent of the slide battery and secures the slide battery to the battery compartment.

8. The power tool of claim 1, wherein:
the first battery compartment tabs extend inwardly from a first side surface of the battery compartment;
the first side surface of the battery compartment includes a first recess that receives a first detent of the slide battery and secures the slide battery to the battery compartment;
the battery compartment further includes a second side surface opposite the first side surface; and the second side surface of the battery compartment includes a second recess that receives a second detent of the slide battery and secures the slide battery to the battery compartment.

9. The power tool of claim 8, further comprising a spring that exerts a force against the slide battery and causes the slide battery to slide toward a disengaged position in response to the first detent and the second detent respectively disengaging the first recess and the second recess.

10. The power tool of claim 1, wherein a first end of the first channel is sized to permit entry of the first slide battery tabs into the first channel via the first end of the first channel.

11. A power tool, comprising:
an electrical component; and
a battery compartment comprising first battery compartment tabs, second battery compartment tabs, and electrical connectors electrically coupled to the electrical component;
wherein the first battery compartment tabs define a first channel between upper surfaces of the first battery compartment tabs and a base surface of the battery compartment;
wherein the second battery compartment tabs define a second channel between upper surfaces of the second battery compartment tabs and the base surface of the battery compartment;
wherein the first channel permits first slide battery tabs of a slide battery to slide along the first channel and traverse multiple first battery compartment tabs as the slide battery is slid into engagement with the electrical connectors; and
wherein the second channel permits second slide battery tabs of the slide battery to slide along the second channel and traverse multiple second battery compartment tabs as the slide battery is slid into engagement with the electrical connectors.

12. The power tool of claim 11, wherein:
the first battery compartment tabs extend inwardly from a first side surface of the battery compartment; and
the second battery compartment tabs extend inwardly from a second side surface of the battery compartment opposite the first side surface of the battery compartment.

13. The power tool of claim 11, wherein:
the first channel runs along a first side surface of the battery compartment; and
the second channel runs along a second side surface of the battery compartment opposite the first side surface of the battery compartment.

14. The power tool of claim 11, further comprising:
a first recess in a first side surface of the battery compartment;
a second recess in a second side surface of the battery compartment opposite the first side surface of the battery compartment;
wherein the first recess is positioned to receive a first detent of the slide battery and secure the slide battery to the battery compartment; and
wherein the second recess is positioned to receive a second detent of the slide battery and secure the slide battery to the battery compartment.

15. The power tool of claim 14, further comprising a spring that exerts a force against the slide battery and causes the slide battery to slide toward a disengaged position in response to the first detent and the second detent respectively disengaging the first recess and the second recess.

16. The power tool of claim 11, wherein:
a first end of the first channel is sized to permit entry of the first slide battery tabs into the first channel via the first end of the first channel; and
a first end of the second channel is sized to permit entry of the second slide battery tabs into the second channel via the first end of the second channel.

17. A power tool system, comprising:
a power tool comprising an electrical component and a battery compartment; and
a slide battery comprising first slide battery tabs and second slide battery tabs;
wherein the battery compartment comprises first battery compartment tabs, second battery compartment tabs, and electrical connectors electrically coupled to the electrical component;
wherein the first battery compartment tabs define a first channel between upper surfaces of the first battery compartment tabs and a base surface of the battery compartment;
wherein the second battery compartment tabs define a second channel between upper surfaces of the second battery compartment tabs and the base surface of the battery compartment;
wherein the first battery compartment tabs are laterally spaced apart to form first openings between side surfaces of adjacent first battery compartment tabs;
wherein the second battery compartment tabs are laterally spaced apart to form second openings between side surfaces of adjacent second battery compartment tabs;
wherein the first channel permits the first slide battery tabs to slide along the first channel and traverse multiple first battery compartment tabs as the slide battery is slid into engagement with the electrical connectors; and
wherein the second channel permits the second slide battery tabs to slide along the second channel and traverse multiple second battery compartment tabs as the slide battery is slid into engagement with the electrical connectors.

18. The power tool system of claim 17, wherein:
the first openings are sized to permit the first slide battery tabs to pass through the first openings and into the first channel; and
the second openings are sized to permit the second slide battery tabs to pass through the second openings and into the second channel.

19. The power tool system of claim 17, wherein:
the first battery compartment tabs extend inwardly from a first side surface of the battery compartment; and
the second battery compartment tabs extend inwardly from a second side surface of the battery compartment opposite the first side surface of the battery compartment.

20. The power tool system of claim 19, wherein:
the first slide battery tabs extend outwardly from a central portion of the slide battery in a first direction; and
the second slide battery tabs extend outwardly from the central portion of the slide battery and in a second direction that is opposite to the first direction.

* * * * *